(12) United States Patent
Huang et al.

(10) Patent No.: US 7,356,580 B1
(45) Date of Patent: Apr. 8, 2008

(54) PLUG AND PLAY SENSOR INTEGRATION FOR A PROCESS MODULE

(75) Inventors: Chung-Ho Huang, Fremont, CA (US); Andrew Lui, Fremont, CA (US); David J. Hemker, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 09/539,313

(22) Filed: Mar. 30, 2000

(51) Int. Cl.
*G06F 15/173* (2006.01)

(52) U.S. Cl. .................... 709/224; 709/224

(58) Field of Classification Search ............. 709/200, 709/202, 203, 220–228; 350/100; 702/116, 702/188, 31, 32; 703/23
See application file for complete search history.

(56) References Cited

U.S. PATENT DOCUMENTS

| | | | |
|---|---|---|---|
| 4,267,572 A | 5/1981 | Witte | 364/498 |
| 4,365,303 A | 12/1982 | Hannah et al. | 364/498 |
| 4,490,806 A | 12/1984 | Enke et al. | 364/734 |
| 4,645,348 A * | 2/1987 | Dewar et al. | 356/603 |
| 5,301,122 A * | 4/1994 | Halpern | 702/62 |
| 5,347,460 A | 9/1994 | Gifford et al. | 364/468 |
| 5,403,621 A | 4/1995 | Jackson et al. | 427/255.1 |
| 5,450,205 A | 9/1995 | Sawin et al. | 356/382 |
| 5,546,322 A | 8/1996 | Gifford et al. | 364/497 |
| 5,664,066 A | 9/1997 | Sun et al. | 395/23 |
| 5,715,051 A | 2/1998 | Luster | 356/239 |
| 5,757,483 A | 5/1998 | Pierce, III | 356/305 |
| 5,831,851 A * | 11/1998 | Eastburn et al. | 700/114 |
| 5,937,365 A * | 8/1999 | Friton et al. | 702/106 |
| 5,977,913 A * | 11/1999 | Christ | 342/465 |
| 6,013,108 A * | 1/2000 | Karolys et al. | 702/189 |
| 6,032,109 A * | 2/2000 | Ritmiller, III | 702/104 |
| 6,077,386 A | 6/2000 | Smith, Jr. et al. | 156/345 |
| 6,090,302 A | 7/2000 | Smith, Jr. et al. | 216/60 |
| 6,091,749 A | 7/2000 | Hoffmaster et al. | 372/38 |

(Continued)

FOREIGN PATENT DOCUMENTS

EP   0552 873 A1   7/1993

(Continued)

OTHER PUBLICATIONS

IEEE Standards Board, IEEE Standard for a Smart Transducer Interface for Sensors and Actuators-Transducer to Microprocessor Communication Protocols and Transducer Electronic Data Sheet (TEDS) Format, Sep. 16, 1997, The Institure of Electrical and Electronics Engineers, Inc., IEEE Std 1451.2-1997, 1-114.*

(Continued)

*Primary Examiner*—David Wiley
*Assistant Examiner*—David England
(74) *Attorney, Agent, or Firm*—IP Strategy Group, P.C.

(57) ABSTRACT

A process chamber with a computer system that controls the process chamber is connected to one or more sensors, which are used to monitor the process in the process chamber. The sensors are connected to the computer system in a client/server relationship, in a way that allows the sensors to be hot swappable plug and play sensors. The computer system exchanges various messages with the sensors, synchronizes with the sensors, and integrates and utilizes data sent from the sensors.

11 Claims, 4 Drawing Sheets

U.S. PATENT DOCUMENTS

| | | | | |
|---|---|---|---|---|
| 6,138,241 | A * | 10/2000 | Eckel et al. | 713/300 |
| 6,157,867 | A * | 12/2000 | Hwang et al. | 700/121 |
| 6,204,768 | B1 * | 3/2001 | Kosugi et al. | 340/577 |
| 6,225,901 | B1 * | 5/2001 | Kail, IV | 340/539 |
| 6,233,492 | B1 * | 5/2001 | Nakamura et al. | 700/2 |
| 6,243,738 | B1 | 6/2001 | Hayles et al. | 709/203 |
| 6,265,831 | B1 | 7/2001 | Howald et al. | 315/111.21 |
| 6,292,108 | B1 * | 9/2001 | Straser et al. | 340/870.11 |
| 6,360,362 | B1 * | 3/2002 | Fichtner et al. | 717/168 |
| 6,370,454 | B1 * | 4/2002 | Moore | 701/29 |
| 6,411,994 | B2 * | 6/2002 | van Allen et al. | 709/219 |
| 6,425,006 | B1 * | 7/2002 | Chari et al. | 709/224 |
| 6,446,192 | B1 * | 9/2002 | Narasimhan et al. | 712/29 |
| 6,493,756 | B1 * | 12/2002 | O'Brien et al. | 709/224 |
| 6,501,377 | B2 * | 12/2002 | Ebata et al. | 340/506 |
| 6,510,350 | B1 * | 1/2003 | Steen et al. | 700/9 |
| 6,515,586 | B1 * | 2/2003 | Wymore | 340/541 |
| 6,529,236 | B1 * | 3/2003 | Watanabe | 348/230.1 |
| 6,535,123 | B2 * | 3/2003 | Sandelman et al. | 340/506 |
| 6,553,336 | B1 * | 4/2003 | Johnson et al. | 702/188 |

FOREIGN PATENT DOCUMENTS

| | | |
|---|---|---|
| EP | 0677737 A2 | 10/1995 |
| FR | 2 692 701 | 12/1993 |
| WO | 99 08168 A | 2/1999 |

OTHER PUBLICATIONS

International Search Report, date mailed Mar. 6, 2002.

U.S. Appl. No. 09/539,312, filed Mar. 30, 2000, entitled: "Integrated Full Wavelength Spectrometer for Wafer Processing".

International Search Report, date mailed Apr. 19, 2002.

Kang B. Lee and Richard D. Schneeman, "Internet-Based Distributed Measurement and Control Applications", IEEE Instrumentation & Measurement Magazine, Jun. 1999, p. 23-27.

* cited by examiner

PLUG AND PLAY SENSOR INTEGRATION FOR A PROCESS MODULE

RELATED APPLICATIONS

This application is related to the commonly assigned application Ser. No. 09/539,312 entitled "INTEGRATED FULL WAVELENGTH SPECTROMETER FOR WAFER PROCESSING", filed on even date herewith and incorporated herein by reference.

BACKGROUND OF THE INVENTION

The present invention relates to the manufacture of semiconductor related devices. More particularly, the present invention relates to improved techniques for manufacturing semiconductor related devices.

In the manufacture of certain types of semiconductor devices, at various times semiconductor devices may be placed in process modules for etching, deposition, polishing, etc. With the small tolerances required in today's semiconductor chips or flat panel displays, various sensors may be required to monitor the process module.

Some sensors may be separated from the process module, where the process module is driven by a first computing system and the sensor is driven by a second computing system, where the first computing system and the second computing system do not exchange data in real time. Synchronization of information between the process module and separate sensors may be difficult. In addition the exchange of data between the process module and separate sensors may be difficult.

Some sensors may be connected to the process module. These sensors could either have their own computing systems that are directly connected to the process module or they may use the computing system of the process module as their computing system. Such sensors can exchange data with the process module in real time. Often different sensors have different protocols. For each sensor the computing system of the process module would be programmed to comply with the protocol of the sensor, possibly requiring the creation of a different driver for each sensor. Each driver might require the specification of many commands, such as commands to signal an alarm, stop the process module, and to indicate when various process steps are initiated or discontinued. In addition, different sensors may generate different types of data so that the driver might need to specify how the process module would use the specific type of data from the sensor. The creation of a driver for each sensor is time consuming, possibly taking as much as one man year. If the process module manufacturer does not take the time to create a driver for a particular sensor the user might not be able to use that sensor with the process module. In addition, even if a driver exists for a sensor, the user may have to perform various steps to install a driver in a process module and specify specific data to be sent to or received from a sensor. To remove the sensor from the process module, a user may need to perform additional programming steps, such as removing a driver and deleting commands for information to be sent to or received from a sensor.

In view of the foregoing, it is desirable to provide a processing system, such as a process module that can be connected to a plurality of sensors, wherein the processing system does not need to be programmed to match various protocols of various sensors. It is desirable to provide a processing system that allows an integration of sensors into the process module that allows the sensors to exchange information with the processing system with minimal additional programming.

SUMMARY OF THE INVENTION

The invention relates, in one embodiment, to a processing system that shares information with sensors in a client-server relationship, wherein recipe and control commands are exchanged between the processing system and sensors.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
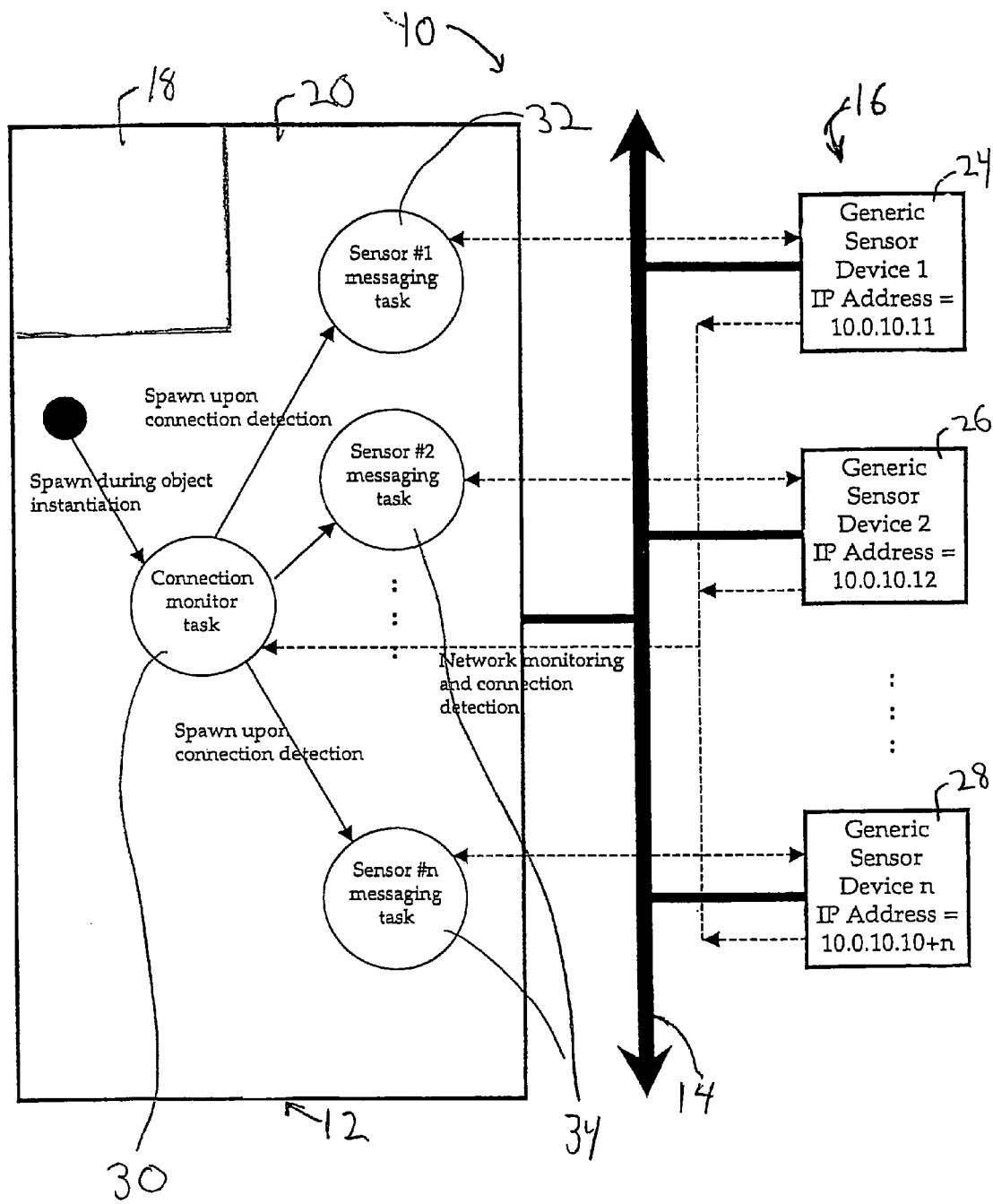
FIG. 1 is a schematic view of a process module and sensors in a preferred embodiment of the invention.

To facilitate discussion, FIG. 1 depicts a schematic view of a system 10, comprising a process module 12, a network 14, and plurality of sensors 16. In this embodiment the process module 12 comprises a process chamber 18 and a process module computing system 20. In the preferred embodiment the process chamber is a process chamber for processing semiconductor related devices, such as an etch chamber, deposition device, or polishing device, used in the manufacturing of semiconductor chips, flat panel displays, disk drives or other computer components. The network 14 may be either an internal bus within the process module computing system 20 or an external network or local area network, such as an Ethernet network, or a combination of both. The process module computing system 20 serves as a server, and the sensors 16 act as clients in a client server relationship with the process module computing system 20. The sensors 16 may be a combination of a sensor and computing device connected to the process module computing system 20 by a local area network, or the sensors 16 may be only sensors connected to an internal bus of the process module computing system 20. In a preferred embodiment of the invention, the process module computing system 20 has a VME architecture, where an input board with a VME bus is used to connect the sensors 16 to the rest of the computing system 20. In this example, a first sensor 24 may be a spectrometer, a second sensor 26 may be a particle monitor sensor, and an nth sensor 28 may be a monitor. Other types of sensors may be a thermometer, which could also be used to provide temperature control like a thermostat, pump sensors, chiller sensors, RF matching system sensors, endpoint system sensors, RGA sensors, IR absorption sensors, RF probes, and data analysis software. Software that analyze data from other sensors may be sensors as defined in the specification and claims. Each of the sensors 16 is able to measure a parameter within the process chamber 18. For example, the spectrometer measures the spectrum within the process chamber 18, the particle monitor measures the particle density within the process chamber 18, the plasma monitor measures the plasma within the process chamber 18, and the thermometer measures the temperature within the process chamber.

Figure 2A:
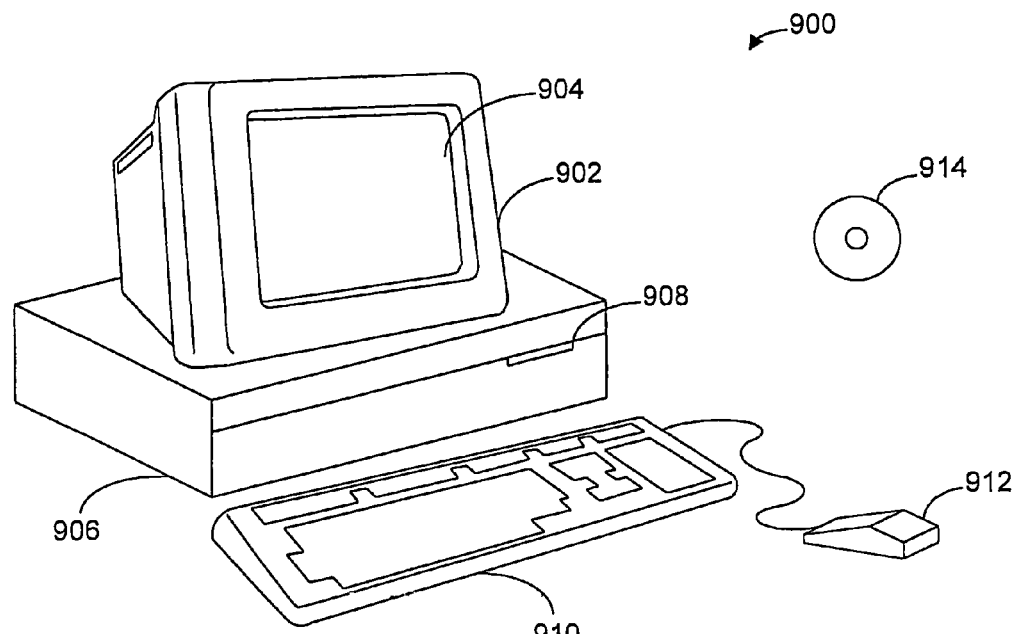
FIG. 2A is a perspective view of a computer system that may be used in an embodiment of the invention.
Figure 2B:
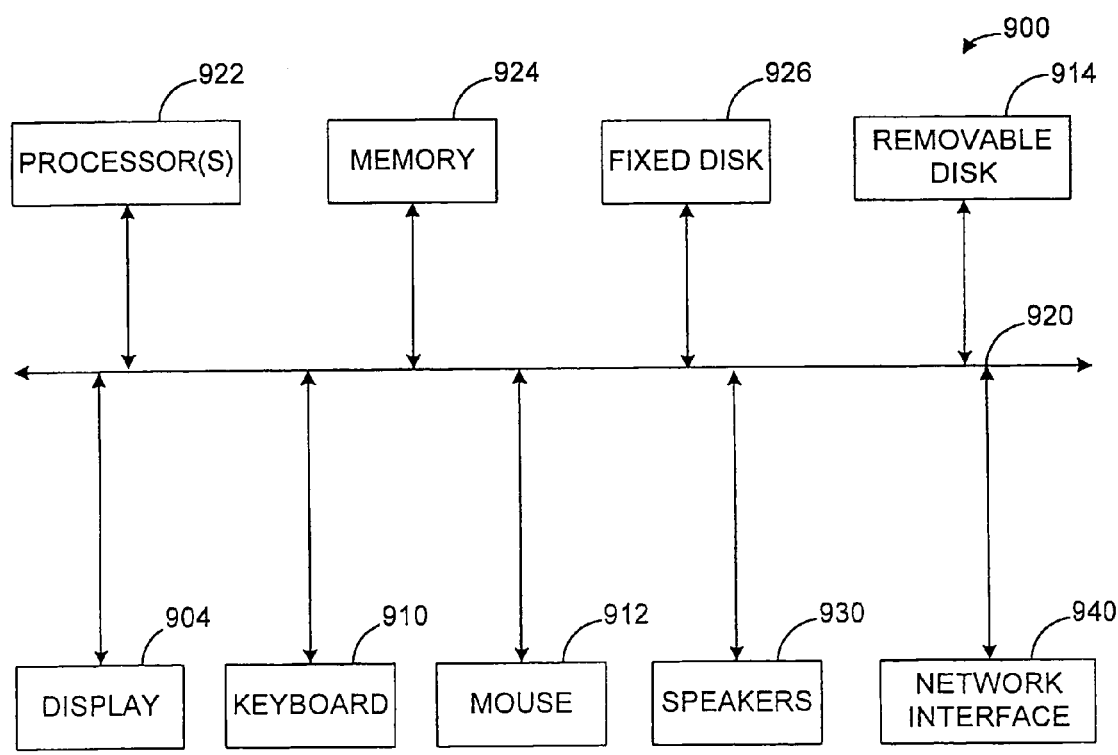
FIG. 2B is a block diagram of the computer system shown in FIG. 2A.

FIGS. 2A and 2B illustrate a computer system 900, which is suitable for implementing embodiments of the present invention. FIG. 2A shows one possible physical form of the computer system. Of course, the computer system may have many physical forms ranging from an integrated circuit, a printed circuit board, an embedded real-time control system, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 2B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable type of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

If a computer system 900 as shown in FIGS. 2A and 2B is used as the process module computing system 20, then part of the computer system bus 920 may form part of the network 14 and a network connected to the network interface 940 may form part of the network 14. In addition, the process module computing system 20 may be connected to other computing systems through the network, where the process module computing system 20 acts as a client.

Figure 3:
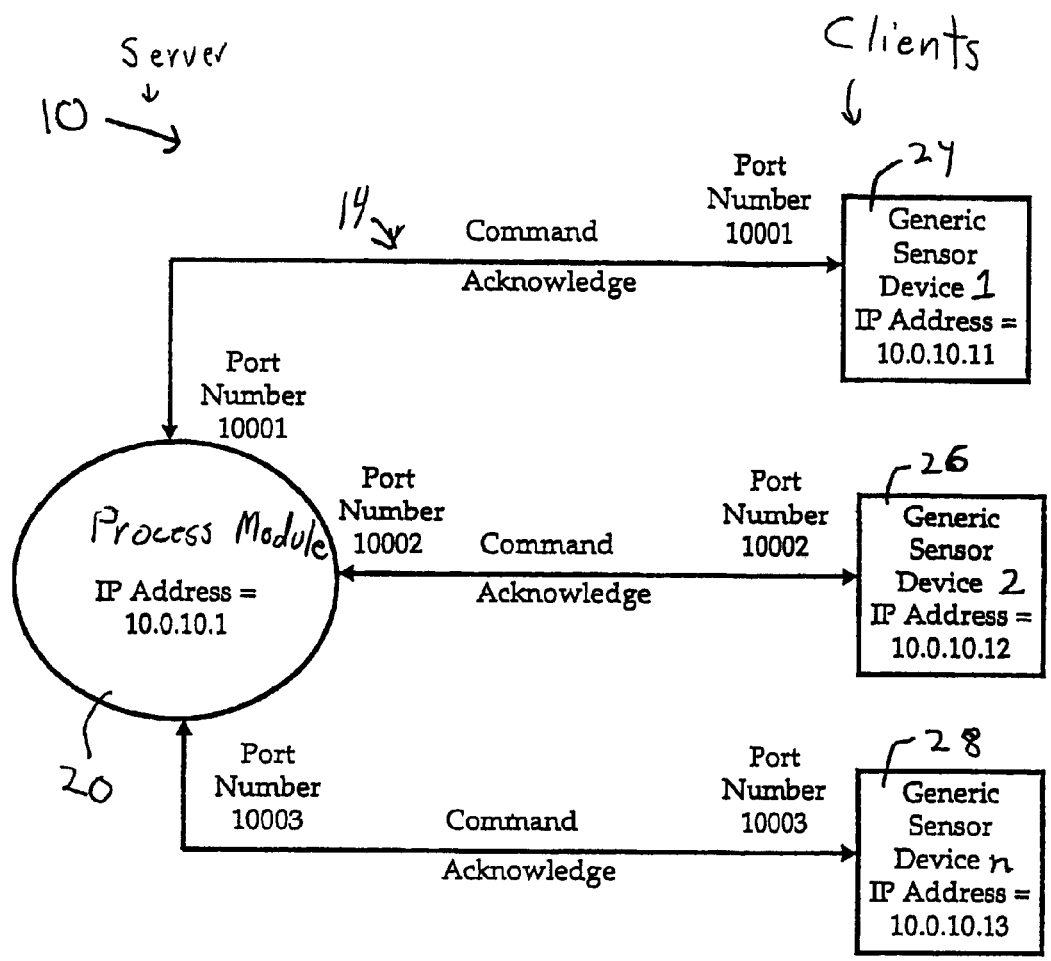
FIG. 3 is another schematic view of the preferred embodiment of the invention.

FIG. 3 is a communications schematic of the system 10 shown in FIG. 1. In the preferred embodiment of the invention, the network 14 is a TCP/IP network. The process module computing system 20 has an IP address and multiple ports to serve as the server of the TCP/IP network. In this example the address of the process module computing system 20 is 10.0.10.1, which has three ports, numbered 10001, 10002, and 10003. Each sensor 16 has an IP address and one port to act as the client of the process module computing system 20. In this example, the sensors 16 have an IP address and one port which indicate that they are ports of the process module computing system 20. For this example, the first sensor 24 has an IP address of 10.0.10.1.11 and a port number of 10001, the second sensor 26 has an IP address of 10.0.10.12 with a port number of 10002, and the nth sensor 28 has an IP address of 10.0.10.13 with a port number of 10003.

Figure 4:
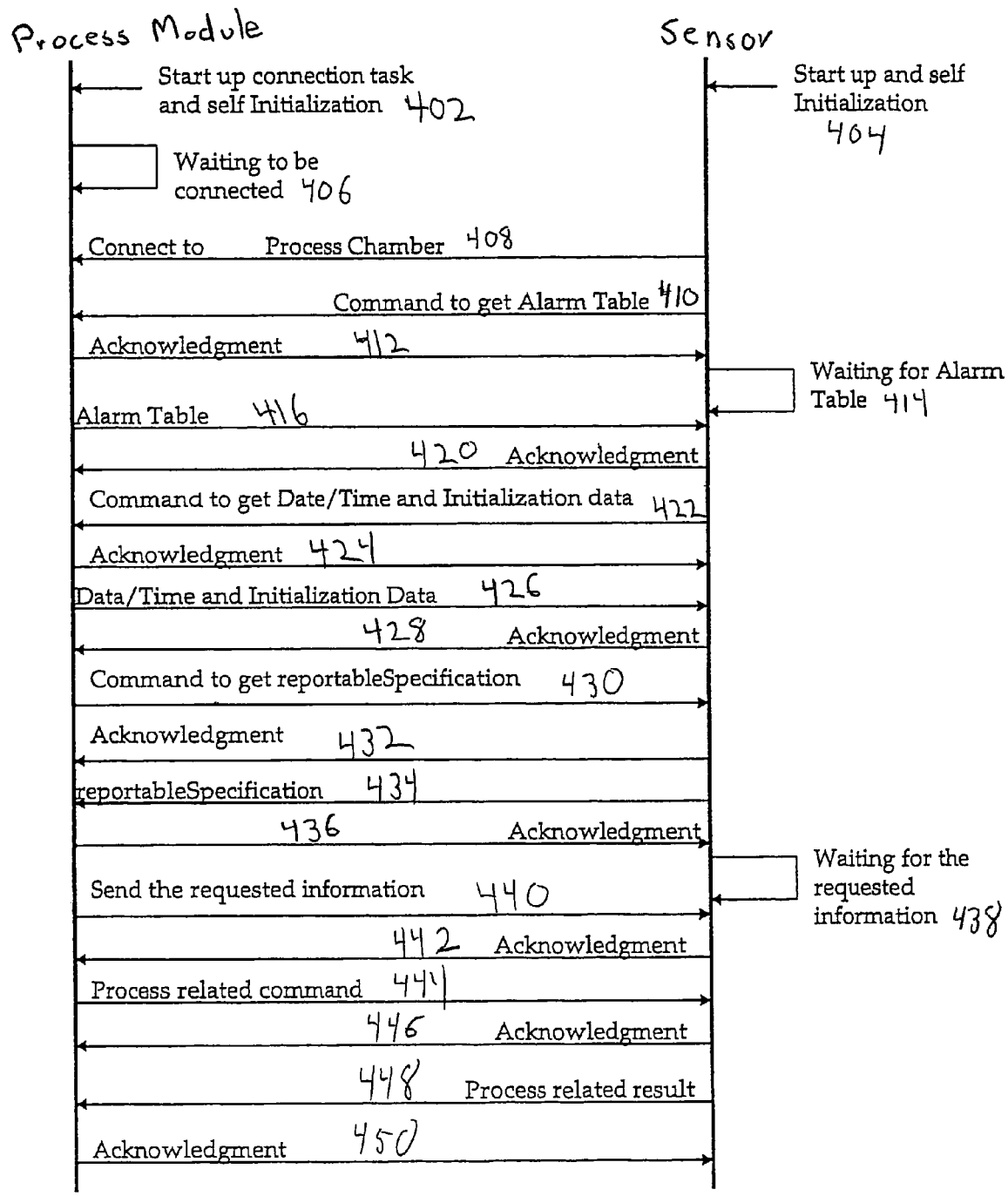
FIG. 4 is a data flow chart of information exchanged between the process module computing system and a sensor.

FIG. 4 is a communication time sequence chart between the process module 12 and a sensor, with time starting at the top of FIG. 4 and proceeding downward. In this example, communications between the process module computing system and the first sensor 24 will be described. In the preferred embodiment of the invention there are only two types of messages (data packets) that are sent between the process module computing system 20 and the first sensor 24. The two types are "Command" messages and "Acknowledgement" messages. A command may be a control command, data report, alarm report, or status report.

The process module computing system 20 and the first sensor 24 are started and self initialized (steps 402 and 404). Because of the process module computing system 20 acts as a server and the first sensor 24 acts as a client, it may not matter whether the process module computing system 20 or the first sensor 24 is started first. When the process module computing system 20 is self-initialized, a connection monitor task object 30 is spawn, as shown in FIG. 1. If the process module computing system 20 is first started, the process module computing system 20 waits to be connected with the first sensor 24 (step 406). Once the first sensor 24 and the process module computing system 20 are both started and self initialized, the first sensor 24 sends a "Connect to Process Chamber" message to the process module computing system 20 (step 408), which is a request by the first sensor 24 to connect to the process module computing system 20 on a client/server basis. When the process module computing system 20 receives the "Connect to Process Module" message from the first sensor 24, a first sensor messaging task 32 is spawn by the connection monitor task 30, as shown in FIG. 1. Similarly, other sensor messaging tasks 34 are spawn when other sensors are connected to the process module 12.

The first sensor 24 then sends a "Command to get Alarm Table" message to the process module computing system 20 (step 410). After the process module computing system 20 receives the "Command to get Alarm Table" message, the computing system 20 responds with an "Acknowledgment" message (step 412). The first sensor 24 receives the "Acknowledgment" message and waits for the alarm table (step 414). The process module computing system 20 sends an "Alarm Table" message to the first sensor 24 (step 416), which designates the number of alarms that the process module will handle. The Alarm Table provides alarm identification numbers and a description of each alarm. When the first sensor 24 receives the "Alarm Table" message the first sensor 24 replies with an "Acknowledgement" message (step 420).

The first sensor 24 then sends a "Command to get Date/Time and Initialization Data" message to the process module computing system 20 (step 422). When the process module computing system 20 receives the "Command to get Date/Time and Initialization Data" message from the first sensor 24, an "Acknowledgement" message is sent to the first sensor 24 (step 424). A "Date/Time and Initialization Data" message is sent from the process module computing system 20 to the first sensor 24 (step 426), which allows the first sensor 24 to be synchronized with the process module computing system 20. When the first sensor 24 receives the "Date/Time and Initialization Data" message from the process module computing system, the first sensor 24 replies with an "Acknowledgement" message (step 428).

The process module computing system 20 then sends a "Command to Get Reportable Specification" message to the first sensor 24 (step 430). When the first sensor 24 receives the "Command to Get Reportable Specification" message, the first sensor 24 replies with an "Acknowledgement" message (step 432). The first sensor 24 then sends a "Reportable Specification" message (step 434), which informs the process module computing system 20 of the type of data that will be provided by the first sensor 24. The process module computing system 20 complies with an "Acknowledgement" message (step 436). Different sensors may generate different types of data. Some of these data types are Boolean, integer, enumerators and floating point. In addition to the type of data, the possible range of data is also important. In addition, the frequency of the data is important, i.e. how often the data is measured. Some sensors may automatically send data, while other sensors may only send data when requested. The "Reportable Specification" message may provide information regarding data type, range, frequency, and distribution, allowing the process module computing system 20 to use the data from the first sensor 24 without requiring additional programming of the process module computing system 20. Since additional programming is not required, a user interface to program the process module computing system 20 to each different sensor data type may not be required.

The first sensor 24 then waits for a request for information (step 438). If the process module computing system 20 needs additional information, a "Send the Requested Information" message is sent from the process module computing system 20 to the first sensor 24 (step 440), to which the first sensor replies with an "Acknowledgement" message (step 442).

Process related command messages are then sent from the process module computing system 20 to the first sensor 24 (step 444), to which the first sensor 24 replies with an "Acknowledgement" message (step 446). The process related commands are a plurality of commands by the process module computing system 20 which relate to actions starting and stopping process steps occurring in the process chamber 18. For example, in an etch chamber a first process related command would be sent to the first sensor 24, sending a recipe to the first sensor 24, to which the first sensor 24 sends an "Acknowledgement" message as a reply. Once the wafer is in the process chamber 18, a second process related command would be sent to the first sensor 24 indicating that the wafer is in the process chamber 18, to which the first sensor 24 sends an "Acknowledgement" message in reply. A third process related command may be sent to the first sensor 24 to indicate the start of the recipe process, to which an "Acknowledgement" message is sent as a reply. When a first step in the recipe is begun, a fourth process related command is sent to the first sensor 24, to which the first sensor 24 sends an "Acknowledgement" message in reply. When a first step in the recipe is terminated, a fifth process related command is sent to the first sensor 24, to which the first sensor 24 sends an "Acknowledgement" reply. Process commands and acknowledgements are made for the starting and stopping of each step in the recipe. At the end of the recipe a "recipe end" process step is sent to the first sensor 24 to which the first sensor 24 sends an acknowledgement. Finally when the wafer is removed, a "wafer out" process command is sent to the first sensor 24 to which the first sensor 24 sends an acknowledgement. Therefore a process related command relating to an action is sent from the process module computing system 20 when the action is executed in the process chamber, where the action may be starting or stopping a step in the process chamber.

During processing, the first sensor 24 may send a "Process Related Result" message to the process module computing system 20 (step 448), to which the process module computing system 20 would send an "Acknowledgement" message to the first sensor 24 as a reply (step 450). The "Process Related Result" message may be an alarm message, which may cause the process module computing system 20 to abort the process. The "Process Related Result" message may provide feedback information, such as temperature, which allows the process module computing system 20 to adjust the temperature accordingly. The "Process Related Result" message may provide data for analysis after the process is completed, which may be stored in the process module computing system 20.

As a result, all sensors 16 may provide real time data that is time stamped and synchronized with the process chamber. The synchronized data allows an in depth analysis of the process for troubleshooting. The real time data may be used to adjust the process in the process chamber during processing. All of the data from all of the sensors 16 may be stored in the process module computing system 20, which acts as a server for the sensors. Using the reportable specification information of each sensor the data may be put in a usable form.

In the preferred embodiment of the invention, a Command message comprises a lead message and a Command Data Packet. The lead message, which in the preferred embodiment is two bytes long, contains the length of the Command Data Packet. The Acknowledgement message comprises a lead message and an Acknowledgement Data Packet. The lead message, which in the preferred embodiment is two bytes long, contains the length of the Acknowledgement Data Packet.

In the preferred embodiment, the first byte of the Command Data Packet holds a predefined level number. More preferably, all communications between the process module computing system 20 and a sensor has a level number of 3. In this case, communications between the process module computing system 20 and other computing systems where the other computing systems are not client sensors of the process module computing system 20 would have a level number that would not be equal to 3. By using level numbers between the process module computing system 20 and other computing systems which are different than level numbers between the process module computing system 20 and client sensor systems, the sensors and process module computing system 20 may more easily determine which messages are for the process module computing system 20 and sensors in a client/server relationship. The second byte of the Command Data Packet comprises a "Command ID" which provides a value between 0 to 255, which is used to designate a command type, such as start recipe, start step, end recipe, abort recipe step, post alarm due to error condition, clear posted alarm, and status information. A third byte of the Command Data Packet provides a transaction number for the command. In the preferred embodiment, the transaction number is between 0 and 15. The remaining bytes of the Command Data packet provide command data.

In the preferred embodiment of the invention an Acknowledgement Data Packet is only 3 bytes long. The purpose of the Acknowledgement Data Packet is to let the sender know that the Command Data Packet has been successfully received by the receiver. In the preferred embodiment of the invention, the first byte of the Acknowledgement Data Packet is a predefined level number, which is equal to the predefined level number of the Command Data Packet. The second byte of the Acknowledgement Data Packet is a number set to indicate that the data packet is an Acknowledgement Data Packet. The third byte of the Acknowledgement Data Packet is the command ID of the received command.

In other embodiments, instead of using TCP/IP as the protocol, other possible protocols are LONWORKS (Local Operation Networks), Devicenet, and RS485/422 with a specific customized protocol. All of these protocols are multidrop. It is preferable not to use the UDP protocol, since UDP protocols tend not to use an acknowledgement, whereas an acknowledgement is used in the preferred embodiment of the invention.

If a message is not received from a sensor for a designated timeout period, a heartbeat message is sent by the process module to the sensor. If no acknowledgement is received, the sensor messaging task is deleted as part of the process of disconnecting the sensor. If a new sensor is added or a sensor with a deleted sensor messaging task sends a connection message, a new sensor messaging task is spawn. Therefore, the sensors 16 may be added to and removed from the network 14 while the process module computing system 20 is running. Thus the sensors 16 are hot swappable plug and play sensors.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer implemented method for communicating between a computing system of a process module, wherein the process module has a process chamber, and a first sensor, comprising the steps of:

initializing the computing system of the process module;

initializing the first sensor, which is able to measure a first parameter in the process chamber;

transmitting a connect message from the first sensor to the computing system of the process module;

transmitting a command to get reportable specification from the computing system of the process module to the first sensor, the computing system having no prior knowledge of a data type specification transmitted by the first sensor upon the transmitting the command to get the reportable specification;

automatically transmitting, upon receiving the command to get the reportable specification, a reportable specification message from the first sensor to the computing system of the process module, the reportable specification message being configured to inform the computing system of the processing module at least the data type specification transmitted by the first sensor;

transmitting a process related command related to the execution of an action in the process chamber from the computing system of the process module to the first sensor; and thereafter receiving, using the computing system of the processing module and the reportable specification message received from the first sensor, sensor data from the first sensor.

2. The computer implemented method, as recited in claim 1, further comprising the steps of:

spawning within the computing system of the process module a connection monitor task;

spawning from the connection monitor task within the computing system of the process module a first sensor messaging task;

transmitting an acknowledgement of the command to get reportable specification from the first sensor to the computing system of the process module; and transmitting an acknowledgement of the reportable specification message from the computing system of the process module to the first sensor.

3. The computer implemented method, as recited in claim 2, further comprising the steps of:

transmitting command to get an alarm table command from the first sensor to the computing system of the process module;

transmitting an acknowledgement of the command to get the alarm table from the computing system of the process module to the first sensor;

transmitting an alarm table from the computing system of the process module to the first sensor, wherein the alarm table designates the number of alarms, alarm identification numbers, and descriptions of the alarms; and transmitting an acknowledgement of the alarm table from the first sensor to the computing system of the process module.

4. The computer implemented method, as recited in claim 3, further comprising the steps of:

transmitting command to get time and initialization data from the first sensor to the computing system of the process module;

transmitting an acknowledgement of the command to get time and initialization data from the computing system of the process module to the first sensor;

transmitting time and initialization data from the computing system of the process module to the first sensor; and transmitting an acknowledgement of the time and initialization data from the first sensor to the computing system of the process module.

5. The computer implemented method, as recited in claim 4, further comprising the steps of:

transmitting a process related command related to the execution of an action in the process chamber from the computing system of the process module to the first sensor;

executing the action in the process chamber, wherein said action relates to the processing of semiconductor related devices; and transmitting an acknowledgement of the process related command from the first sensor to the computing system of the process module.

6. The computer implemented method, as recited in claim 5, further comprising the steps of:

initializing a second sensor, which is able to measure a second parameter in the process chamber;

transmitting a connect message from the second sensor to the computing system of the process module;

transmitting a command to get reportable specification from the computing system of the process module to the second sensor;

transmitting a reportable specification message from the second sensor to the computing system of the process module;

initializing a third sensor, which is able to measure a third parameter in the process chamber;

transmitting a connect message from the third sensor to the computing system of the process module;

transmitting a command to get reportable specification from the computing system of the process module to the third sensor; and transmitting a reportable specification message from the third sensor to the computing system of the process module.

7. The computer implemented method, as recited in claim 6, further comprising the steps of:

spawning from the connection monitor task within the computing system of the process module a second sensor messaging task;

transmitting an acknowledgement of the command to get reportable specification from the second sensor to the computing system of the process module;

transmitting an acknowledgement of the reportable specification message from the computing system of the process module to the second sensor;

spawning from the connection monitor task within the computing system of the process module a third sensor messaging task;

transmitting an acknowledgement of the command to get reportable specification from the third sensor to the computing system of the process module; and transmitting an acknowledgement of the reportable specification message from the computing system of the process module to the third sensor.

8. The computer implemented method, as recited in claim 7, further comprising the steps of:

transmitting command to get an alarm table command from the second sensor to the computing system of the process module;

transmitting an acknowledgement of the command to get the alarm table from the computing system of the process module to the second sensor;

transmitting an alarm table from the computing system of the process module to the second sensor;

transmitting an acknowledgement of the alarm table from the second sensor to the computing system of the process module;

transmitting command to get an alarm table command from the third sensor to the computing system of the process module;

transmitting an acknowledgement of the command to get the alarm table from the computing system of the process module to the third sensor;

transmitting an alarm table from the computing system of the process module to the third sensor; and transmitting an acknowledgement of the alarm table from the third sensor to the computing system of the process module.

9. The computer implemented method, as recited in claim 8, further comprising the steps of:

transmitting command to get time and initialization data from the second sensor to the computing system of the process module;

transmitting an acknowledgement of the command to get time and initialization data from the computing system of the process module to the second sensor;

transmitting time and initialization data from the computing system of the process module to the second sensor;

transmitting an acknowledgement of the time and initialization data from the second sensor to the computing system of the process module;

transmitting command to get time and initialization data from the third sensor to the computing system of the process module;

transmitting an acknowledgement of the command to get time and initialization data from the computing system of the process module to the third sensor;

transmitting time and initialization data from the computing system of the process module to the third sensor; and transmitting an acknowledgement of the time and initialization data from the third sensor to the computing system of the process module.

10. The computer implemented method, as recited in claim 1, wherein the reportable specification also provides possible range of data and frequency of data that will be provided from the sensor.

11. The computer implemented method, as recited in claim 10, wherein the reportable specification further provides whether the data needs to be requested from the sensor or will be automatically sent.

* * * * *